United States Patent
Ono et al.

(10) Patent No.: US 10,476,075 B2
(45) Date of Patent: Nov. 12, 2019

(54) ZINC NEGATIVE ELECTRODE MATERIAL FOR SECONDARY CELL

(71) Applicants: Nissan Motor Co., Ltd., Yokohama-shi, Kanagawa (JP); National University Corporation, Kyoto University, Sakyo-ku, Kyoto, Kyoto (JP)

(72) Inventors: Masaki Ono, Kanagawa (JP); Akiyoshi Nakata, Kyoto (JP); Hajime Arai, Kyoto (JP); Zempachi Ogumi, Kyoto (JP)

(73) Assignees: Nissan Motor Co., Ltd., Yokohama-shi, Kanagawa (JP); National University Corporation, Kyoto University, Sakyo-Ku, Kyoto, Kyoto (JP)

( * ) Notice: Subject to any disclaimer, the term of this patent is extended or adjusted under 35 U.S.C. 154(b) by 57 days.

(21) Appl. No.: 15/772,733

(22) PCT Filed: Nov. 1, 2016

(86) PCT No.: PCT/JP2016/082375
§ 371 (c)(1),
(2) Date: May 1, 2018

(87) PCT Pub. No.: WO2017/077991
PCT Pub. Date: May 11, 2017

(65) Prior Publication Data
US 2019/0214636 A1 Jul. 11, 2019

(30) Foreign Application Priority Data

Nov. 6, 2015 (JP) .................. 2015-218656

(51) Int. Cl.
| | |
|---|---|
| H01M 4/36 | (2006.01) |
| C01G 23/047 | (2006.01) |
| C01G 9/00 | (2006.01) |
| H01M 4/38 | (2006.01) |
| H01M 4/48 | (2010.01) |
| H01M 4/42 | (2006.01) |
| H01M 4/24 | (2006.01) |

(Continued)

(52) U.S. Cl.
CPC .............. *H01M 4/366* (2013.01); *C01G 9/00* (2013.01); *C01G 23/047* (2013.01); *H01M 4/244* (2013.01); *H01M 4/38* (2013.01); *H01M 4/42* (2013.01); *H01M 4/48* (2013.01); *H01M 12/08* (2013.01); *H01M 10/24* (2013.01); *H01M 2004/021* (2013.01); *H01M 2004/027* (2013.01); *Y02E 60/128* (2013.01)

(58) Field of Classification Search
CPC .......... H01M 4/366; H01M 4/48; H01M 4/38; H01M 4/244; H01M 4/42; C01G 23/047; C01G 9/00
See application file for complete search history.

(56) References Cited

U.S. PATENT DOCUMENTS

| | | |
|---|---|---|
| 6,261,709 B1 | 7/2001 | Passaniti et al. |
| 2002/0031701 A1 | 3/2002 | Kawakami et al. |

(Continued)

FOREIGN PATENT DOCUMENTS

| | | |
|---|---|---|
| JP | S57126068 A | 8/1982 |
| JP | S57163963 A | 10/1982 |

(Continued)

OTHER PUBLICATIONS

Lee et al., "Characteristics and Electrochemical Performance of the TiO2-Coated ZnO Anode for Ni—Zn Secondary Batteries" J. Phys. Chem. C 2011, 115, 2572-2577.

*Primary Examiner* — Stewart A Fraser
(74) *Attorney, Agent, or Firm* — Young Basile Hanlon & MacFarlane, P.C.

(57) ABSTRACT

A zinc anode material for secondary cells includes zinc-containing particles that are coated with a coating composition containing at least one oxide of a metal selected from titanium, zirconium, magnesium, tin and yttrium. The surface localization ratio of the coating composition of Equation (1) ranges from 1.6 to 16. In Equation (1), the surface metal atomic ratio of the coating composition is represented by Equation (2), and the bulk metal atomic ratio of the coating composition is represented by Equation (3).

$$\text{Surface Localization Ratio of Coating Composition} = \frac{\text{Surface Metal Atomic Ratio of Coating Composition}}{\text{Bulk Metal Atomic Ratio of Coating Composition}} \quad \text{Equation (1)}$$

$$\text{Surface Metal Atomic Ratio of Coating Composition} = \frac{\text{Metal Atomic in Surface Coating Composition/mol \%}}{\text{Metal Amount in Surface Coating Composition} + \text{Surface Zn Amount/mol \%}} \quad \text{Equation (2)}$$

$$\text{Bulk Metal Atomic Ratio of Coating Composition} = \frac{\text{Metal Atomic in Coating Composition/mol}}{\text{Metal Amount in Coating Composition} + \text{Zn Amount/mol}} \quad \text{Equation (3)}$$

9 Claims, No Drawings

(51) Int. Cl.
*H01M 12/08* (2006.01)
*H01M 10/24* (2006.01)
*H01M 4/02* (2006.01)

(56) References Cited

U.S. PATENT DOCUMENTS

| | | |
|---|---|---|
| 2007/0180688 A1 | 8/2007 | Kawakami et al. |
| 2009/0169996 A1* | 7/2009 | Zhamu ............... D01F 9/21 429/221 |
| 2011/0033747 A1* | 2/2011 | Phillips ............... H01M 4/244 429/212 |
| 2014/0157586 A1* | 6/2014 | Phillips ............... H01M 4/0416 29/623.5 |

FOREIGN PATENT DOCUMENTS

| | | |
|---|---|---|
| JP | H03272563 A | 12/1991 |
| JP | H5144431 A | 6/1993 |
| JP | H6283157 A | 10/1994 |
| JP | 2013062242 A | 4/2013 |
| JP | 2015170390 A | 9/2015 |

* cited by examiner

ZINC NEGATIVE ELECTRODE MATERIAL FOR SECONDARY CELL

CROSS-REFERENCE TO RELATED APPLICATION

The present application is based on Japanese Patent Application No. 2015-218656 filed on Nov. 6, 2015, the entire content of which is herein incorporated by reference.

TECHNICAL FIELD

The present invention relates to a zinc anode material (negative electrode material) for secondary cells. In more detail, the present invention relates to a zinc anode material for secondary cells such as air-zinc secondary cells and nickel-zinc secondary cells.

BACKGROUND

In recent years, it has been desperately desired to reduce carbon dioxide emission in order to cope with air pollution and global warming. In the automobile industry, expectations have been focused on introduction of electric vehicles (EV) and hybrid electric vehicles (HEV) as means for reducing carbon dioxide emission.

As for electric vehicles, it is particularly required that the range per charge and the performance are comparable to those of gasoline vehicles. Development of secondary cells for driving a motor is a key to putting them into practice, which have been intensively conducted.

In secondary cells for driving a motor, lithium-ion secondary cells with high energy density have drawn attention and are now in rapid development. However, it has been pointed out that it is very difficult to achieve a goal with conventional technical improvements in lithium-ion secondary cells.

In this regard, metal-air cells (batteries) using zinc for the anode has drawn attention, which are considered to have a potential of achieving higher energy density than lithium-ion secondary cells.

Zinc (Zn) used in such metal-air cells are inexpensive material that is abundant on the earth and has high theoretical capacity density. It has been desired to put such secondary cells using zinc as the anode into practice because of the low cost and the potential of achieving the greatly increased energy density compared to conventional secondary cells that have been practically used.

However, a problem with zinc secondary cells using aqueous electrolytic solution is the very short charge-discharge cycle life, which is a significant hurdle that has to be overcome to put them into practice.

That is, in secondary cells using zinc as the anode active material, repetitive charge and discharge cause degradation of the cell performance such as the occurrence of an internal short circuit and a decrease of the discharge capacity due to growth of zinc dendrite, densification, shape change or the like.

By a discharge reaction of the following Chemical Equation (1), zincate anion ($Zn(OH)_4^{2-}$) soluble to strong alkaline electrolytic solution is produced as a discharge product from zinc.

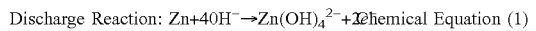

Discharge Reaction: $Zn+4OH^- \rightarrow Zn(OH)_4^{2-}+2e^-$   Chemical Equation (1)

In order to prevent such Zn components from being dissolved into the electrolytic solution, strong alkaline aqueous solution saturated with zinc oxide (ZnO) is generally used as the electrolytic solution of cells with a zinc electrode.

However, even when ZnO is saturated, zincate anion is dissolved in a supersaturated condition up to a concentration several times higher than the saturated solubility. Therefore, the zincate anion produced by discharge can be readily diffused or migrated into the electrolytic solution.

During the process of charging or discharging the anode, when the zincate anion concentration locally exceeds the supersaturated solubility, or when the supersaturated solubility of zincate anion is decreased as a result of a local decrease of the $OH^-$ concentration of the electrolytic solution, the zincate anion is deposited as solid zinc oxide by a chemical reaction of the following Chemical Equation (2).

$Zn(OH)_4^{2-} \rightarrow ZnO+H_2O+2OH^-$   Chemical Equation (2)

That is, it is considered that the shape change of the zinc electrode proceeds since repetitive charge and discharge cause repetitive deposition and precipitation of zinc oxide as described above at the same location in the anode.

By a charge reaction in the zinc anode, zinc oxide species (ZnO or $Zn(OH)_4^{2-}$) are electrochemically reduced to produce metal zinc.

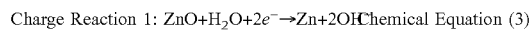

Charge Reaction 1: $ZnO+H_2O+2e^- \rightarrow Zn+2OH^-$   Chemical Equation (3)

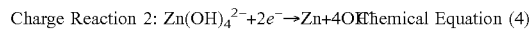

Charge Reaction 2: $Zn(OH)_4^{2-}+2e^- \rightarrow Zn+4OH^-$   Chemical Equation (4)

However, since metal zinc is soluble to the strong alkaline electrolytic solution, a hydrogen-generating dissolution reaction of the following Chemical Equation (5) occurs to cause self-discharge that consumes the produced metal zinc. As a result, the discharge capacity of the zinc anode is decreased relative to the charge capacity.

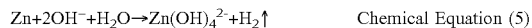

$Zn+2OH^-+H_2O \rightarrow Zn(OH)_4^{2-}+H_2 \uparrow$   Chemical Equation (5)

To suppress the self-discharge of the zinc anode caused by the hydrogen-generating dissolution reaction, measures such as usage of electrolytic solution with low alkaline concentration have been attempted. However, the decrease in ion conductivity and the increase in $H_2O$ activity of the electrolytic solution cause an increase of a hydrogen-generating side reaction during charge of the zinc electrode and the like. Since the resultant increase of the charge and discharge overvoltage leads to disadvantages of the increased energy loss and the decreased charge-discharge efficiency, it is difficult to use electrolytic solution with low alkaline concentration.

Characteristics and Electrochemical Performance of the TiO2-Coated ZnO Anode for Ni—Zn Secondary Batteries, S-H Lee et al., J. Phys. Chem. C, 115, 2572 (2011) discloses that a secondary cell using zinc oxide (ZnO) particles allegedly coated with titanium oxide ($TiO_2$) as an active material has improved charge cycle durability than secondary cells using non-coated native zinc oxide (ZnO) particles as an active material.

SUMMARY

However, the cell disclosed in Characteristics and Electrochemical Performance of the TiO2-Coated ZnO Anode for Ni—Zn Secondary Batteries, S-H Lee et al., J. Phys. Chem. C, 115, 2572 (2011) experiences a continuous decrease of the discharge capacity as the charge-discharge cycles increases since the surface of the zinc oxide particles is not coated with the titanium oxide in a suitable state.

Therefore, the charge-discharge cycle durability is still insufficient. Further, the discharge capacity in early cycles is also insufficient.

The present invention has been made in view of the above-described problems with the prior art, and an object thereof is to provide a zinc anode material for secondary cells that can improve the charge cycle durability and suppress the self-discharge of the secondary cell.

As a result of a keen study for achieving the above-described object, the present inventors have found that the above-described object can be achieved by coating zinc-containing particles with a coating layer in a suitable state. The present invention has been thus completed.

That is, the zinc anode material for secondary cells of the present invention includes zinc-containing particles that are coated with a coating composition containing at least one oxide of a metal selected from titanium (Ti), zirconium (Zr), magnesium (Mg), tin (Sn) and yttrium (Y). Further, the surface localization ratio of the coating composition represented by the following Equation (1) ranges from 1.6 to 16.

$$\text{Surface Localization Ratio of Coating Composition} = \frac{\text{Surface Metal Atomic Ratio of Coating Composition}}{\text{Bulk Metal Atomic Ratio of Coating Composition}} \quad \text{Equation (1)}$$

In Equation (1), the surface metal atomic ratio of the coating composition is represented by the following Equation (2), and the bulk metal atomic ratio of the coating composition is represented by the following Equation (3).

$$\text{Surface Metal Atomic Ratio of Coating Composition} = \frac{\text{Metal Atomic in Surface Coating Composition/mol \%}}{\text{Metal Amount in Surface Coating Composition} + \text{Surface Zn Amount/mol\%}} \quad \text{Equation (2)}$$

$$\text{Bulk Metal Atomic Ratio of Coating Composition} = \frac{\text{Metal Atomic in Coating Composition/mol}}{\text{Metal Amount in Coating Composition} + \text{Zn Amount/mol}} \quad \text{Equation (3)}$$

With the present invention, it is possible to obtain a zinc anode material for secondary cells with high charge-discharge cycle durability since a zinc-containing active material is coated in a suitable state with a specific coating composition that has sufficient chemical and electrochemical stability in an environment in a cell using zinc as the negative terminal.

DETAILED DESCRIPTION

The zinc anode material for secondary cells of the present invention, which includes a zinc-containing active material with a coating layer, will be described in detail.

First, the materials of the zinc anode material for secondary cells of the present invention will be described.

Coating Composition

Coating compositions that can be used for the coating layer are stable in strong alkaline electrolytic solution within the range of the charge or discharge potential of zinc and have an overvoltage for a hydrogen-generating reaction during charge (production of metal zinc) equal to or greater than zinc.

That is, since a composition that causes the hydrogen-generating reaction ($2H_2O+2e^- \rightarrow H_2+2OH^-$) simultaneously with the metal zinc forming reaction ($Zn(OH)_4^{2-} + 2e^- \rightarrow Zn+4OH^-$) would decrease the charge efficiency of zinc, the composition to be used has an overvoltage for the hydrogen-generating reaction equal to or greater than zinc.

Examples of such coating compositions include oxides of metals selected from titanium (Ti), zirconium (Zn), magnesium (mg), tin (Sn) and yttrium (Y).

The chemical stability of the metal oxides was evaluated by measuring the dissolution amount of the metal oxides to strong alkaline electrolytic solution.

Specifically, powders of the metal oxides were immersed in 8 M potassium hydroxide (KOH) aqueous solution maintained at 60° C. for 7 days, and thereafter the metal components dissolved in the aqueous solution was quantitatively analyzed by the ICP-AES method. The evaluation results are shown in Table 1.

TABLE 1

| Metal Oxide | Elution Amount |
| --- | --- |
| $TiO_2$ | detection limit or less (<10 ppm) |
| ZrO2 | detection limit or less (<10 ppm) |
| MgO | detection limit or less (<10 ppm) |
| SnO2 | detection limit or less (<10 ppm) |
| Y2O3 | detection limit or less (<10 ppm) |

The evaluation test simulates a condition of a cell in storage, and the chemical stability of a coating composition in electrolytic solution can be evaluated with the test. All the metal oxides listed above exhibited a dissolution amount of metal components equal to or less than the detection limit, i.e. were very stable. It was therefore found that they have sufficient chemical stability as anode materials.

Further, a reductive polarization test was conducted for the above-listed metal oxides. Specifically, the surfaces of pure metal plates were thermally oxidized so that fine oxide coatings were formed. They were immersed in strong alkaline electrolytic solution (4 M KOH aqueous solution) as test electrodes. The reductive polarization test was conducted at a temperature of 25° C. at a constant sweeping rate (−1 mV/s) from the open-circuit potential to the potential corresponding to the zinc charge potential (−1.60 V vs. Hg/HgO) by linear sweep voltammetry. The current density and the presence or absence of a change in the outer appearance of the test electrodes were evaluated. The evaluation results are shown in Table 2.

TABLE 2

| Test Electrode | Reductive Current Density @−1.6 V vs Hg/HgO | Change in Outer Appearance of Test Electrode |
| --- | --- | --- |
| Ti Oxide | <1 mA/cm² | no change |
| Zr Oxide | <1 mA/cm² | no change |
| Mg Oxide | <1 mA/cm² | no change |
| Sn Oxide | <1 mA/cm² | no change |
| Y Oxide | <1 mA/cm² | no change |

The above-listed metal oxides have a reductive current density at −1.60 V vs. Hg/HgO of less than 1 mA/cm².

Furthermore, they are electrochemically stable since the strong alkaline electrolytic solution do not cause dissolution, shape change or color change. Based on this, they can be considered to have sufficiently low hydrogen-generating reaction rate and are applicable as a material of the coating composition.

Since the above-listed metal oxides have sufficiently low electron conductivity and are chemically and electrochemically stable in strong alkaline electrolytic solution, any reaction that involves the coating composition containing the above-listed metal oxide is not caused even when reductive polarization occurs.

Therefore, the usage of the above-listed metal oxides as the coating composition of the zinc anode allows only the charge reaction to selectively proceed during charge and to suppress other side reactions. As a result, the zinc-containing anode can maintain high charge efficiency even in the presence of the coating composition containing the above-listed metal oxide.

Zinc-Containing Active Material

Zinc-containing active materials that can be used include materials that contain at least one of zinc and a zinc compound such as zinc oxide as an anode active material, preferably particular zinc-containing active materials.

The zinc anode material for secondary cells of the present invention, in which the zinc-containing active material is coated with the coating layer, has a surface localization ratio of the coating composition represented by the following Equation (1) of 1.6 to 16.

$$\text{Surface Localization Ratio of Coating Composition} = \frac{\text{Surface Metal Atomic Ratio of Coating Composition}}{\text{Bulk Metal Atomic Ratio of Coating Composition}} \quad \text{Equation (1)}$$

In the Equation (1), the surface metal atomic ratio of the coating composition is represented by the following Equation (2), and the bulk metal atomic ratio of the coating composition is represented by the following Equation (3).

$$\text{Surface Metal Atomic Ratio of Coating Composition} = \frac{\text{Metal Atomic in Surface Coating Composition/mol \%}}{\text{Metal Amount in Surface Coating Composition} + \text{Surface Zn Amount/mol\%}} \quad \text{Equation (2)}$$

$$\text{Bulk Metal Atomic Ratio of Coating Composition} = \frac{\text{Metal Atomic in Coating Composition/mol}}{\text{Metal Amount in Coating Composition} + \text{Zn Amount/mol}} \quad \text{Equation (3)}$$

The zinc anode material for secondary cells with a surface localization ratio of the coating composition represented by the above Equation (1) of 1.6 to 16 forms the coating layer from which the coating composition is hardly released. Since this can prevent or suppress a shape change and self-discharge of the zinc anode material, the zinc anode material has high charge-discharge cycle durability.

That is, not only the coating composition of the present invention is attached to the zinc-containing active material to cover the surface of the zinc-containing active material, but also a considerable part thereof is fixed on the surface of the zinc-containing active material and hardly released.

Therefore, it can prevent a Zn discharge product formed during discharge from freely migrating in the electrolytic solution so as to keep the Zn discharge product around the production site.

The occurrence of a shape change of the electrode such as growth of dendrite is suppressed probably because the Zn discharge product kept around the production site is reduced and thus return to the production site or the vicinity thereof during charge.

Since the zinc-containing active material is coated with the coating layer, diffusion and dissolution of zinc species soluble to the electrolytic solution are greatly reduced, and the concentration of the dissolved zinc species is kept at a high level on the surface of zinc-containing active material. This can greatly suppress the dissolution reaction of metal zinc such as Chemical Equation (5) and thus prevent a decrease of the capacity due to the self-discharge reaction.

When the surface localization ratio of the coating composition is less than 1.6, the effect of preventing diffusion of the zinc discharge product is reduced since only a small amount of coating composition is fixed on the zinc-containing active material. Therefore, a significant improvement is not achieved in the charge-discharge cycle durability life. Further, the ratio of the exposed zinc-containing active material that directly contacts with the electrolytic solution is increased, and the self-discharge reaction proceeds since elution and diffusion of the metal zinc cannot be prevented. Furthermore, a large amount of the coating composition does not contribute to preventing diffusion of the discharge product, which results in the decreased energy density.

When the surface localization ratio of the coating composition is greater than 16, diffusion of $H_2O$ and $OH^-$ and conduction of electrons to the zinc-containing active material required for the electrode reactions are prevented since the excessive amount of coating composition is fixed on the surface of the zinc-containing active material. This results in a difficulty of charge or discharge itself and the degraded performance of the cell.

The surface localization ratio of the coating composition will be described. The ratio of the coating composition that is present in the surface of the zinc anode material for secondary cells can be determined from the ratio of the metal in the coating composition to the sum of the coating composition metal and the zinc that are present in the surface of the zinc anode material.

The ratio of the coating composition metal can be measured by X-ray photoelectron spectroscopy (XPS). The X-ray photoelectron spectroscopy is to measure the element distribution in the surface of the zinc anode material (to a depth of several nanometer).

However, some of the coating composition present in the surface of the zinc-containing active material is not fixed on the zinc-containing active material but is only attached to the zinc-containing active material, which is referred to as unfixed coating composition. That is, such unfixed coating composition, which is only attached and does not contribute to restricting migration of the discharge product, is also detected in the X-ray photoelectron spectroscopy.

In other words, the zinc anode material for secondary cells may be a mixture of the coated zinc-containing active material that is coated with the coating composition fixed on the surface of the zinc-containing active material, and the free unfixed coating composition that is not fixed on the zinc-containing active material.

In such a mixture, the amount of unfixed coating composition only located on the surface of the zinc-containing active material is increased as the content of unfixed coating composition is increased relative to the coated zinc-containing active material. Therefore, it is impossible to know the amount of coating composition that is fixed on the zinc-containing active material by the X-ray photoelectron spectroscopy.

The amount of unfixed coating composition that is present in the surface of the zinc-containing active material by being located on the surface of the zinc-containing active material is smaller than the amount of the coating composition that is localized in the surface of the zinc-containing active material by being fixed on the surface of the zinc-containing active material.

In the present invention, the amount of coating composition fixed on the zinc-containing active material is defined by the above-described surface localization ratio of the coating composition that represents the ratio of the metal atoms of the coating composition present in the surface of the zinc-containing active material to the bulk metal atoms of the coating composition contained in the entire zinc anode material for secondary cells.

The surface metal atomic ratio of the coating composition of Equation (2) represents the amount of the coating composition in the surface of the zinc anode material for secondary cells, which can be measured by measuring the kind, amount and the like of the elements present in the surface (to a depth of several nm) of the zinc anode material for secondary cells by the X-ray photoelectron spectroscopy (XPS) and determining the atomic concentration by using an analysis software.

The bulk metal atomic ratio of the coating composition of Equation (3) represents the amount of coating composition in the entire zinc anode material for secondary cells, which can be measured by the inductively coupled plasma (ICP) emission spectroscopy.

Specifically, the zinc anode material for secondary cells is dissolved into dilute acid aqueous solution to prepare sample solution. The solution is introduced to argon (Ar) plasma in the form of mist. The light that is emitted when excited elements returns to the ground state is spectroscopically measured. The elements can be qualitatively and quantitatively measured respectively from the wavelength and the intensity.

The surface localization ratio of the coating composition is the ratio of the coating composition present in the surface of the zinc-containing active material to the coating composition contained in the entire zinc anode material for secondary cells, which does not represent the coverage, i.e. the percentage of the surface of the zinc-containing active material being coated with the coating composition. That is, even when the coverage is the same, the smaller surface area of the zinc-containing active material tends to result in the larger surface localization ratio of the coating composition.

It is preferred that the zinc anode material for secondary cells of the present invention has a surface metal atomic ratio of the coating composition of 0.087 to 0.90.

When the surface metal atomic ratio of the coating composition is equal to or greater than 0.087, the coverage is sufficiently high with respect to the amount of zinc discharge product to be produced in a deep charge and discharge, many charge-discharge cycles and a low-rate charge-discharge cycle that takes a long time, and the zinc discharge product can be prevented from diffusion for a long time. Therefore, the cell exhibits high charge-discharge cycle durability.

When the surface metal atomic ratio of the coating composition is equal to or less than 0.90, the concentration of the zinc discharge product is not extremely increased inside the coating layer, and the charge-discharge efficiency is not decreased. As a result, an increase of zinc, which is electrochemically inactive and not used for charge and discharge, can be prevented. The cell does not experience a decrease of the discharge capacity in every charge-discharge cycle and exhibits high charge-discharge cycle durability.

It is preferred that the zinc anode material for secondary cells of the present invention has a volume of pores with a pore size of 5 nm or less with respect to the total pore volume (the volume of pores with a pore size of 5 nm or less/the total pore volume) of 0.12 or more.

The coating composition itself of the coating layer is not necessarily electron-conductive or ion-conductive. Migration of substances required for the electrode reactions are enabled by the pores through which the substances required for the electrode reactions can migrate. That is, since the coating layer has the pores, the substances required for the electrode reactions can migrate through the pores although the surface of the zinc-containing active material is covered with the coating layer.

The pores with a pore size of 5 nm or less can prevent diffusion of the zinc discharge product without interrupting migration of the substances required for the electrode reactions. Since the volume of pores with a pore size of 5 nm or less with respect to the total pore volume is equal to or greater than 0.12, diffusion of the zinc discharge product can be prevented.

The ability of the pores with a pore size of 5 nm or less to prevent diffusion of the zinc discharge product cannot be explained only with a physical sieving effect. Although not completely revealed yet, the pore size of 5 nm diameter or less is considered to be the diameter at which the interaction between the pore inner walls of the coating composition and the zinc discharge product starts to be effective.

That is, it is considered that diffusion of the zinc discharge product is effectively controlled in pores with a diameter of 5 nm or less by diffusion matrix that is actually formed in the pores, the electrostatic interaction between the pore inner walls and the zinc discharge product and the like.

When the volume of the pores with a pore size of 5 nm or less is less than 0.12, the volume of pores with a larger size is increased. Since such larger pores have a less effect of preventing diffusion of the zinc discharge product, the effect of the coating composition to improve the charge-discharge cycle may sometimes be decreased.

The pore size distribution is measured by a nitrogen adsorption method. The pore size distribution can be determined from an analysis result by the BJH method.

In the nitrogen adsorption method, nitrogen molecules cannot get into pores that are smaller than the effective diameter of nitrogen molecules as the adsorptive medium (thickness of an adsorbed nitrogen monolayer, 0.354 nm) even when such pores are present. Therefore, the volume of pores with a size of 0.354 nm or less is not measured. The pore volume can be accurately measured for pores with a pore size of at least twice the effective diameter of the adsorptive medium molecule or more.

That is, the above-described "pore size of 5 nm or less" substantially means the range of 0.7 nm to 5 nm.

The pore size distribution is adjustable by changing the calcining conditions, the conditions of hydrolysis of a metal alkoxide of the metal oxide of the coating composition or the like.

It is preferred that the thickness of the coating layer ranges from 5 to 500 nm. When the thickness of the coating layer is less than 5 nm, the effect of preventing diffusion of the zinc discharge product is not sufficiently obtained, and the charge-discharge cycle durability may sometimes not be sufficiently improved. When the thickness is greater than 500 nm, the substances required for the electrode reactions such as $H_2O$, $OH^-$ and electrons migrate a longer distance. Since the coating layer is likely to become a rate limiting region for the migration of the substances in charge and discharge reactions, a practical charging rate or high output may sometimes not be achieved.

The thickness of the coating composition is measured by precisely forming a cross section of the anode material by microtomy, ion milling or the like and observing the cross section under an electron microscope.

The thickness of the coating layer is adjustable by changing the content of a metal alkoxide, which is to be the metal oxide of the coating composition, and the amount of linker added or the like.

Next, a method for producing the zinc anode material for secondary cells of the present invention will be described. The zinc anode material for secondary cells can be produced by hydrolyzing the metal alkoxide, which is to be the metal oxide of the coating composition, to obtain a metal oxide precursor, fixing the metal oxide precursor on the surface of the zinc-containing active material with a linker and thereafter calcining it.

Such linkers that can be used include substance that is charged in the opposite polarity to the charge of the surface of the zinc-containing active material and the surface of the metal oxide.

Examples of the linkers include organic compounds with multiple amino groups such as urea, oxamide, ethylenediamine, putrescine, phenylenediamine and glycine amide, organic compounds with multiple carboxylic groups such as dicarboxylic acids, organic compounds with both an amino group and a carboxylic group, and the like, although they depend on the liquid property of anode material dispersion and the metal oxide precursor for the coating composition.

It is preferred that the amount of the linker used is equal to or greater than an equivalent of the metal oxide precursor. By using the linker in the equivalent amount or more, it is possible to fix almost all the metal oxide precursor on the zinc-containing active material and to reduce the amount of unfixed coating composition that does not contribute to restricting migration of the discharge product. This can improve the energy density.

Whether or not the coating composition is fixed on the zinc-containing active material by a linker can also be checked by detecting an element derived from the linker, e.g. nitrogen (N) by X-ray photoelectron spectroscopy (XPS).

An example of the calcining conditions is calcining in inert gas such as air or argon gas at a temperature of from 300° C. to 400° C. for 1 to 10 hours Zinc Secondary Cell Next, a zinc secondary cell according to an embodiment of the present invention will be described. By applying the above-described zinc anode material for secondary cells to alkaline secondary cells such as air-zinc secondary cells and nickel-zinc secondary cells, it becomes possible to prevent generation of hydrogen gas due to a side reaction, generation of dendrite due to deposition of zinc and shape change of zinc. As a result, long-lasting charge-discharge cycles and good charge-discharge efficiency can be achieved.

The zinc secondary cell of the embodiment includes a cathode, an anode and an electrolytic solution, in which the above-described zinc anode material for secondary cells of the present invention is used for the anode.

Suitable examples of cathodes include an air electrode composed of a carbon material, an oxygen reduction catalyst and a binder, a nickel electrode composed of metal hydroxides, which contain nickel oxyhydroxides as a main component, and a current collector of foamed nickel or the like, and the like. However, the cathode is not limited thereto, and materials known in the art used for the cathode of alkaline secondary cells can also be suitably used.

Examples of electrolytic solutions include alkaline electrolytic solutions in which an alkaline salt is dissolved in water. Suitable examples of such alkaline salts include potassium hydroxide (KOH), sodium hydroxide (NaOH), lithium hydroxide (LiOH) and the like. They can be used alone or in combination of two or more.

In the present invention, it is only required that a redox reaction with the anode can be repetitively caused, and thus the electrolytic solution is not limited thereto.

EXAMPLES

Hereinafter, the present invention will be described in more detail with examples. However, it is not intended to limit the present invention to the following examples.

Example 1

Production of $TiO_2$-coated Zn Particles

Zn powder was used as a Zn active material, and titanium (IV) tetrabutoxide (TNBT) was used as a Ti source.

A predetermined amount of TNBT was dissolved in 1-butanol. The Zn powder is added thereto, and the mixture was stirred well to produce Zn particle-dispersed TNBT solution.

The Zn powder-dispersed solution was heated at 60° C. in a water bath, and the ammonia water at a pH of approximately 11 was added to hydrolyze the TNBT.

Urea was added to the Zn powder-dispersed solution, and the mixture was stirred at 60° C. for 1.5 hours so that the nanoparticles of a $TiO_2$ precursor produced by the hydrolysis of the TNBT was attached and fixed on the surface of the Zn powder.

Thereafter, the powder component was filtrated from the Zn powder-dispersed solution, sufficiently washed with pure water, dried and thereafter calcined in the air at 330° C. for 5 hours. Thus, $TiO_2$-coated Zn powder was obtained.

In order to determine the bulk metal atomic ratio of the coating composition of the $TiO_2$-coated Zn powder thus prepared, a quantitative analysis by ICP-AES was conducted.

Specifically, a predetermined amount of the $TiO_2$-coated Zn powder was melted with alkaline metal salt, and the melt was dissolved into an acid and suitably diluted with water. The sample thus obtained was subjected to the quantitative analysis of metal components using an inductively coupled plasma optical emission spectrometer (SPS-3520, SII Nanotechnology Corp.).

The result was Ti 65.2 mol % and Zn 5.0 mol %, and the bulk metal atomic ratio of the coating composition was 0.072.

To determine the surface metal atomic ratio of the coating composition of the $TiO_2$-coated Zn powder thus prepared, an analysis of the surface metal composition by X-ray photoelectron spectroscopy (XPS) was conducted.

Specifically, a predetermined amount of $TiO_2$-coated Zn powder was placed on a sample holder of an X-ray photoelectron spectrometer (ESCA 5800, ULVAC-PHI Inc.), and a measurement was conducted. A 300 W monochromatic Al-Kα ray (1486.6 eV) was used as an X-ray source to obtain a wide scanning spectrum, from which the sample was qualitatively and quantitatively characterized. The photoelectron take-off angle was 45° (measurement depth of approx. 5 nm), and the measurement area was φ 800 μm.

The result was Ti 17.6 mol % and Zn 14.1 mol %, and the surface metal atomic ratio of the coating composition was 0.56.

The $TiO_2$-coated Zn powder had a surface localization ratio of the coating composition of 7.8, a pore volume ratio of pores with a pore size of 5 nm or less of 0.53, and a coating layer thickness of 40 nm.

Further, the surface nitrogen concentration measured by X-ray photoelectron spectroscopy was 1.4 mol %. This surface nitrogen was derived from the urea used as the linker. Since the urea was vaporized or decomposed in the calcining step, it is considered that the nitrogen does not remain in the form of urea but is present as some kind of nitrogen compound in the area from the interface between the surface of zinc inside the coating layer and the coating layer to the inside of the porous coating layer and the surface of the coating layer.

Production of $TiO_2$-Coated Zn Anode

The $TiO_2$-coated Zn powder (92 parts by mass), 4 parts by mass of a conductive material (acetylene black) and 4 parts by mass of a binder (polyfluorinated vinylidene (PVdF) were mixed, and N-methylpyrollidone was added thereto to obtain slurry. The slurry thus obtained was applied on the surface of a current collector material (Cu foil), dried and pressed to form an anode active material layer. Thus, an $TiO_2$-coated Zn anode was obtained.

Production of Cell

The $TiO_2$-coated Zn anode, a separator (two-layered polyolefin non-woven fabric separator) and a cathode of nickel oxyhydroxide (NiO(OH)) are laminated, and the laminate was immersed in electrolytic solution (ZnO-saturated 4 M KOH aqueous solution). Thus, a secondary cell was obtained.

Charge-Discharge Cycle Test

The secondary cell thus produced was subjected to a charge-discharge cycle test.

In the charge-discharge cycle test, each charge-discharge cycle was at 0.5 C to a zinc utilization of 75%. In the cycle test, the potential of the anode with respect to an Hg/HgO reference electrode was monitored so that the degree of deterioration can be measured only for the anode. The test was conducted at 25° C. As the charge-discharge cycle durability, the anode durability was evaluated, in which the cycle count until the actual discharge capacity is decreased to 90% or less with respect to the discharge capacity corresponding to a zinc utilization of 75% was defined as the end of the charge-discharge cycle test.

Measurement of Self-Discharge Rate

A cell having the same configuration as the test cell for the charge-discharge cycle test was subjected to a self-discharge rate evaluation test. In the self-discharge rate evaluation test, repetitive charge and discharge was performed for conditioning, and it was confirmed that the charge-discharge characteristics became stable. After the zinc anode was completely discharged, the cell was charged to a depth of charge of 75% at a charge rate of 0.5 C. After the charge, the cell was aged in an open-circuit condition for 12 hours and then discharged until a zinc electrode potential became −0.90 V vs. Hg/HgO at a rate of 0.5 C. The discharge coulomb efficiency was determined by comparing the charge electricity with the discharge electricity. The higher the self-discharge rate, the lower the discharge coulomb efficiency. In the test, it was assumed that there was no charge loss of metal zinc due to side reactions during charge (hydrogen-generating reaction, etc.), and the self-discharge rate was measured by Self-Discharge Rate=100(%)−Discharge Efficiency (%). All tests were conducted at 25° C. The evaluation results are shown in Table 3.

Example 2

$TiO_2$-coated Zn particles were produced in the same preparation method as in Example 1 except that the calcining was carried out in Argon. Calculation of the surface localization ratio of the coating composition, production of an electrode and a charge-discharge cycle test were carried out in the same conditions as in Example 1.

The $TiO_2$-coated Zn powder had a bulk metal atomic ratio of the coating composition of 0.065, a surface localization ratio of the coating composition of 8.3, a volume ratio of pores with a pore size of 5 nm or less of 0.48 and a coating layer thickness of 50 nm. Further, the surface nitrogen concentration was 2.3 mol %.

Example 3

$TiO_2$-coated Zn particles were produced in the same preparation method as in Example 1 except that the calcining time was 2 hours. Calculation of the surface localization ratio of the coating composition, production of an electrode and a charge-discharge cycle test were carried out in the same conditions as in Example 1.

The $TiO_2$-coated Zn powder had a bulk metal atomic ratio of the coating composition of 0.072, a surface localization ratio of the coating composition of 9.0, a volume ratio of pores with a pore size of 5 nm or less of 0.26 and a coating layer thickness of 55 nm. Further, the surface nitrogen concentration was 0.9 mol %.

Example 4

$TiO_2$-coated Zn particles were produced in the same preparation method as in Example 1 except that the amount of Ti source charged was reduced by half. Calculation of the surface localization ratio of the coating composition, production of an electrode and a charge-discharge cycle test were carried out in the same conditions as in Example 1.

The $TiO_2$-coated Zn powder had a bulk metal atomic ratio of the coating composition of 0.043, a surface localization ratio of the coating composition of 2.0, a volume ratio of pores with a pore size of 5 nm or less of 0.16 and a coating layer thickness of 5 nm. Further, the surface nitrogen concentration was 0.6 mol %.

Example 5

$TiO_2$-coated Zn particles were produced in the same preparation method as in Example 1 except that the amount of Ti source charged was doubled. Calculation of the surface localization ratio of the coating composition, production of an electrode and a charge-discharge cycle test were carried out in the same conditions as in Example 1.

The $TiO_2$-coated Zn powder had a bulk metal atomic ratio of the coating composition of 0.060, a surface localization ratio of the coating composition of 15.0, a volume ratio of pores with a pore size of 5 nm or less of 0.12 and a coating layer thickness of 100 nm. Further, the surface nitrogen concentration was 2.5 mol %.

Example 6

TiO$_2$-coated Zn particles were produced in the same preparation method as in Example 1 except that the amount of Ti source charged was doubled, and the calcining was carried out at 300° C. in argon. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.084, a surface localization ratio of the coating composition of 11.0, a volume ratio of pores with a pore size of 5 nm or less of 0.096 and a coating layer thickness of 95 nm. Further, the surface nitrogen concentration was 4.1 mol %.

Example 7

TiO$_2$-coated Zn was produced in the same preparation method as in Example 4 except that the materials were stirred at 40° C. after the addition of urea. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.025, a surface localization ratio of the coating composition of 2.9, a volume ratio of pores with a pore size of 5 nm or less of 0.093 and a coating layer thickness of 8 nm. Further, the surface nitrogen concentration was 2.1 mol %.

Example 8

TiO$_2$-coated Zn was produced in the same preparation method as in Example 1 except that the calcining atmosphere was argon containing 5 vol % of hydrogen. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.084, a surface localization ratio of the coating composition of 5.8, a volume ratio of pores with a pore size of 5 nm or less of 0.39 and a coating layer thickness of 60 nm. Further, the surface nitrogen concentration was 2.2 mol %.

Example 9

TiO$_2$-coated Zn was produced in the same preparation method as in Example 1 except that the amount of Ti source charged was doubled, and the calcining atmosphere was argon containing 5 vol % of hydrogen. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.068, a surface localization ratio of the coating composition of 12, a volume ratio of pores with a pore size of 5 nm or less of 0.13 and a coating layer thickness of 100 nm. Further, the surface nitrogen concentration was 1.9 mol %.

Example 10

TiO$_2$-coated Zn was produced in the same preparation method as in Example 1 except that the materials were stirred at 40° C. after the addition of urea, and the calcining atmosphere was argon containing 5 vol % of hydrogen. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.060, a surface localization ratio of the coating composition of 8.5, a volume ratio of pores with a pore size of 5 nm or less of 0.33 and a coating layer thickness of 30 nm. Further, the surface nitrogen concentration was 2.6 mol %.

Example 11

TiO$_2$-coated Zn was produced in the same preparation method as in Example 1 except that the amount of Ti source charged was doubled, and the calcining atmosphere was argon containing 5 vol % of hydrogen. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.045, a surface localization ratio of the coating composition of 1.6, a volume ratio of pores with a pore size of 5 nm or less of 0.098 and a coating layer thickness of 5 nm. Further, the surface nitrogen concentration was 2.9 mol %.

Example 12

TiO$_2$-coated Zn was produced in the same preparation method as in Example 1 except that the amount of Ti source charged was reduced by half, the materials were stirred at 40° C. after the addition of urea, and the calcining atmosphere was argon containing 5 vol % of hydrogen. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.060, a surface localization ratio of the coating composition of 16, a volume ratio of pores with a pore size of 5 nm or less of 0.066 and a coating layer thickness of the of 100 nm. Further, the surface nitrogen concentration was 2.9 mol %.

Comparative Example 1

The sample was produced in the preparation method described in Non-Patent Document 1 (J. Phys. Chem. C, 115, 2572 (2011)).

Specifically, Zn powder was dispersed in ethanol, and TNBT was added thereto. The dispersion was stirred for 6 hours and then heated to 70° C. and further stirred until it turned into gel. The gelled precursor was sufficiently washed with pure water, dried and then calcined at 330° C. in the air for 5 hours. TiO$_2$-coated Zn powder was thus obtained. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.062, a surface localization ratio of the coating composition of 1.1, a volume ratio of pores with a pore size of 5 nm or less of 0.086. The coating layer thickness was unmeasurable because formation of a definite TiO$_2$ coating layer was not observed on the zinc particle surface. Further, the surface nitrogen concentration was equal to or less than the detection limit (<0.1 mol %).

Comparative Example 2

TiO$_2$-coated Zn was produced in the same preparation method as in Example 1 except that the amount of Ti source charged was reduced to ⅛. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.027, a surface localization ratio of the coating composition of 1.0, a volume ratio of pores with a pore size of 5 nm or less of 0.10 and a coating layer thickness of 3 nm. Further, the surface nitrogen concentration was 0.5 mol %.

Comparative Example 3

TiO$_2$-coated Zn powder was produced in the same preparation method as in Example 1 except that the amount of Ti source charged was tripled, and the calcining temperature was 380° C. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.054, a surface localization ratio of the coating composition of 18.0, a volume ratio of pores with a pore size of 5 nm or less of 0.051 and a coating layer thickness of 140 nm. Further, the surface nitrogen concentration was 1.1 mol %.

Comparative Example 4

TiO$_2$-coated Zn was produced in the same preparation method as in Example 1 except that urea is not added. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.057, a surface localization ratio of the coating composition of 1.3, a volume ratio of pores with a pore size of 5 nm or less of 0.081 and a coating layer thickness of 3 nm or less. Further, the surface nitrogen concentration was equal to or less than the detection limit (<0.1 mol %)

Comparative Example 5

TiO$_2$-coated Zn was produced in the same preparation method as in Example 1 except that the amount of Ti source charged was doubled, the materials were stirred at 40° C. after the addition of urea, and the calcining was performed at 300° C. under a flow of argon containing 5 vol % of hydrogen for 2 hours. Calculation of the surface localization ratio of the coating composition, production of an electrode and a charge-discharge cycle test were carried out in the same conditions as in Example 1.

The TiO$_2$-coated Zn powder had a bulk metal atomic ratio of the coating composition of 0.056, a surface localization ratio of the coating composition of 17, a volume ratio of pores with a pore size of 5 nm or less of 0.10 and a coating layer thickness of the of 140 nm. Further, the surface nitrogen concentration was 3.1 mol %.

TABLE 3

| | Surface Localization Ratio of Coating Composition | Bulk Metal Atomic Ratio of Coating Composition | Surface Metal Atomic Ratio of Coating Composition |
|---|---|---|---|
| Example 1 | 7.8 | 0.072 | 0.56 |
| Example 2 | 8.3 | 0.065 | 0.54 |
| Example 3 | 9.0 | 0.072 | 0.65 |
| Example 4 | 2.0 | 0.043 | 0.087 |
| Example 5 | 15.0 | 0.060 | 0.90 |
| Example 6 | 11.0 | 0.084 | 0.92 |
| Example 7 | 2.9 | 0.025 | 0.072 |
| Example 8 | 5.8 | 0.084 | 0.49 |
| Example 9 | 12 | 0.068 | 0.81 |
| Example 10 | 8.5 | 0.060 | 0.51 |
| Example 11 | 1.6 | 0.045 | 0.072 |
| Example 12 | 16 | 0.060 | 0.960 |
| Comparative Example 1 | 1.1 | 0.062 | 0.068 |
| Comparative Example 2 | 1.0 | 0.027 | 0.027 |
| Comparative Example 3 | 18.0 | 0.054 | 0.98 |
| Comparative Example 4 | 1.3 | 0.057 | 0.074 |
| Comparative Example 5 | 1.7 | 0.056 | 0.95 |

| | Volume Ratio of Pores of 5 nm or Less | Coating Layer Thickness (nm) | Cycle Number | Self-Discharge Ratio (%) |
|---|---|---|---|---|
| Example 1 | 0.53 | 40 | 126 | 1.2 |
| Example 2 | 0.48 | 50 | 124 | 1.1 |
| Example 3 | 0.26 | 55 | 119 | 1.3 |
| Example 4 | 0.16 | 5 | 91 | 1.4 |
| Example 5 | 0.12 | 100 | 80 | 1.8 |
| Example 6 | 0.096 | 95 | 58 | 1.9 |
| Example 7 | 0.093 | 8 | 56 | 1.8 |
| Example 8 | 0.39 | 60 | 108 | 1.6 |
| Example 9 | 0.13 | 100 | 90 | 1.5 |
| Example 10 | 0.33 | 30 | 120 | 1.1 |
| Example 11 | 0.098 | 5 | 68 | 1.4 |
| Example 12 | 0.066 | 100 | 62 | 1.8 |
| Comparative Example 1 | 0.086 | — | 26 | 4.2 |
| Comparative Example 2 | 0.1 | 3 | 20 | 4.8 |
| Comparative Example 3 | 0.051 | 140 | 0 | 4.6 |
| Comparative Example 4 | 0.081 | 3 | 30 | 4.0 |
| Comparative Example 5 | 0.10 | 140 | 8 | 4.8 |

Secondary cells using the zinc anode materials for secondary cells of Examples exhibited a charge-discharge cycle durability of twice or more greater than that of the secondary cell of Comparative Example 1.

The preparation method of the zinc anode material for secondary cells of Comparative Example 1 was such that titanium alkoxide was hydrolyzed with water vapor in the air, the step of forming TiO$_2$ precursor particles was carried out in zinc powder-dispersed solution, and thereafter solvent ethanol was evaporated by heat so that the particles turn into gel.

Since the zinc particles and the TiO$_2$ precursor particles are likely to aggregate individually in the zinc powder-dispersed solution, it is considered that the zinc anode material for secondary cells produced by this method is a simple mixture of TiO$_2$ and Zn.

That is, since the surfaces of the zinc particles and the TiO$_2$ precursor particles are both negatively charged and repel each other in the dispersion of the preparation method of Comparative Example 1, it is considered very difficult to attach the TiO$_2$ precursor particles on the surface of the zinc particles or to coat the surface of the zinc particles with the TiO$_2$ precursor particles.

Also, from the fact that the zinc anode material for secondary cells of Comparative Example 1 exhibited a surface localization ratio of the coating composition of approximately 1, it is considered that the zinc anode material for secondary cells produced by the preparation method of Comparative Example 1 is a simple mixture of TiO$_2$ and Zn. When such zinc anode material for secondary cells was used for an anode, improved charge-discharge cycle durability was hardly observed.

In contrast, the zinc anode material for secondary cells of Examples are produced by forming the TiO$_2$ precursor in zinc powder dispersion and thereafter further adding urea so as to coat the zinc surface with the TiO$_2$ precursor.

Since the amino groups at both ends of the molecules of the urea are positively charged in the zinc powder dispersion, the urea serves as a linker that couples the negatively charged surfaces of the zinc particles to the surfaces of the TiO$_2$ precursor particles.

In the zinc anode materials for secondary cells of Examples, the urea functions as described above to attach and fix the TiO$_2$ precursor particles on the surface of the zinc particles to form the coating layer.

Also, from the fact that the surface localization ratio of the coating composition was much greater than 1, the coating composition fixed on the surface of the zinc particles coats the zinc surface at a high coverage in the zinc anode material for secondary cells of Examples.

Example 11 with a surface localization ratio of the coating composition of 1.6 gave a self-discharge ratio of 1.4% while Comparative Example 4 with a surface localization ratio of the coating composition of 1.3 gave a high self-discharge ratio of 4.0. This shows that self-discharge can be reduced when the surface localization ratio of the coating composition is equal to or greater than 1.6.

Example 12 with a surface localization ratio of the coating composition of 16 gave a charge-discharge cycle number of 62, which shows the charge-discharge reactions were not inhibited by the coating layer. In contrast, Comparative Example 5 with a surface localization ratio of 17 gave a decreased charge-discharge count of 8 since the charge-discharge reactions were inhibited.

The invention claimed is:

1. A zinc anode material for a secondary cell, comprising:
    a zinc-containing active material comprising at least a coating layer,
    wherein a coating composition of the coating layer contains at least one oxide of a metal selected from titanium (Ti), zirconium (Zr), magnesium (Mg), tin (Sn) and yttrium (Y), and
    a surface localization ratio of the coating composition represented by the following Equation (1) ranges from 1.6 to 16:

$$\text{Surface Localization Ratio of Coating Composition} = \frac{\text{Surface Metal Atomic Ratio of Coating Composition}}{\text{Bulk Metal Atomic Ratio of Coating Composition}} \quad \text{Equation (1)}$$

where the surface metal atomic ratio of the coating composition is represented by the following Equation (2), and the bulk metal atomic ratio of the coating composition is represented by the following Equation (3):

$$\text{Surface Metal Atomic Ratio of Coating Composition} = \frac{\text{Metal Atomic in Surface Coating Composition/mol \%}}{\text{Metal Amount in Surface Coating Composition} + \text{Surface Zn Amount/mol \%}} \quad \text{Equation (2)}$$

$$\text{Bulk Metal Atomic Ratio of Coating Composition} = \frac{\text{Metal Atomic in Coating Composition/mol}}{\text{Metal Amount in Coating Composition} + \text{Zn Amount/mol}} \quad \text{Equation (3)}$$

2. The zinc anode material for a secondary cell according to claim 1, wherein the surface metal atomic ratio of the coating composition ranges from 0.087 to 0.90.

3. The zinc anode material for a secondary cell according to claim 2, wherein a pore volume of pores with a pore size of 5 nm or less with respect to a total pore volume (pore volume of pores with a pore size of 5 nm or less/total pore volume) is equal to or greater than 0.12.

4. The zinc anode material for a secondary cell according to claim 2, wherein a thickness of the coating layer ranges from 5 to 500 nm.

5. A zinc anode for a secondary cell, comprising:
    an anode material on a base,
    wherein said anode material is the zinc anode material for a secondary cell according to claim 2.

6. The zinc anode material for a secondary cell according to claim 1, wherein a pore volume of pores with a pore size of 5 nm or less with respect to a total pore volume (pore volume of pores with a pore size of 5 nm or less/total pore volume) is equal to or greater than 0.12.

7. The zinc anode material for a secondary cell according to claim 1, wherein a thickness of the coating layer ranges from 5 to 500 nm.

8. A zinc anode for a secondary cell, comprising:
    an anode material on a base,
    wherein said anode material is the zinc anode material for a secondary cell according to claim 1.

9. A secondary cell, comprising:
    a cathode; an anode; and an electrolytic solution,
    wherein said anode is the zinc anode for a secondary cell according to claim 8.

* * * * *